3,230,919
METHOD OF REDUCING HYDRODYNAMIC DRAG OF OBJECTS MOVING THROUGH WATER
Horace R. Crawford, Richardson, Tex., assignor to The Western Company of North America, Fort Worth, Tex., a corporation of Delaware
No Drawing. Filed July 6, 1961, Ser. No. 122,095
7 Claims. (Cl. 114—67)

This invention relates to a method of increasing the speed through water of an object, such as a ship, boat or other craft.

It is well known that the power necessary to drive a boat or ship through a body of water is approximately proportional to the cube of the velocity of the craft. Thus if it is desired to increase the velocity of the craft through the water by about 60%, it is necessary to increase the power input four times. This high consumption of power is necessitated by the hydrodynamic drag of the water on the hull of the craft. Because of this high power loss caused by the hydrodynamic drag, it is not economically feasible to equip most water craft with a power plant to drive the craft through the water at a very rapid speed. Thus water craft are usually propelled at a rate which is only a fraction of that possible with the automobile or aeroplane.

It is, therefore, an object of the present invention to provide a method of increasing the speed of a craft, ship, or other object through the water without increasing the power input.

It is another object of the present invention to provide a method of increasing the speed of a craft, ship or boat through the water, by merely adding a chemical agent to the water through which at least a portion of the craft will pass.

It is a further object of the present invention to provide a method of increasing the speed of a craft through the water by injecting a chemical shear-thinning agent into the water in the path of the craft.

Other objects will be apparent to those skilled in the art from reading the present description.

The method of the present invention comprises spraying or injecting into the water through which at least a portion of a water craft will travel a chemical shear-thinning agent. For convenience, the chemical shear-thinning agent may be employed and added to the body of water in the form of an aqueous solution or suspension. Desirably, the shear-thinning agent will be added to the water ahead of the prow of the craft to provide optimum effectiveness, for then the entire length of the craft will pass through treated water. However, advantages of the invention may in part be obtained by introducing the shear-thinning agent into the water just ahead of the screw or propeller.

The method of the invention is applicable to all water craft. As will be apparent to those skilled in the art, the benefits of the invention are particularly beneficial to ships of large tonnage and to military craft. In the case of ships of large tonnage the power input is of a high order and if this can be reduced the savings provided are quite large. In the case of naval craft it is highly desirable to be able to increase the speed of the craft to a high speed, particularly during periods of combat or other naval action. One type of naval craft which is contemplated to be particularly benefitted by the method of the present invention is the submarine. The submarine, during periods of combat, is usually operated in a completely submerged condition under which condition the effects of hydrodynamic drag are at their greatest. By injecting a shear-thinning agent out of the bow of the submarine as it travels through the water, the drag can be greatly reduced and the speed of the submarine substantially increased.

The shear-thinning agents which may be employed in the method of the invention are materials which impart to the water a shear-thinning property, that is the property of having a ratio of shear stress to shear rate which decreases as the shear rate increases. Shear-thinning fluids are those defined by a committee of the Society of Rheology under the chairmanship of R. R. Myers and published in "Transactions of the Society of Rheology," III, pages 205–206 (1959). As expressed by the committee shear-thinning fluids or materials have a ratio S/D which decreases with increasing D. In this ratio S is a measure of shear stress and D is a measure of shear rate. It is intended to incorporate this authoritative definition of the committee by reference in its entirety and when the term "shear-thinning agent" is employed in the present specification and the appended claims it is intended to refer to those agents falling within the definition of the committee.

The concentration of shear-thinning agent to be employed will vary according to the specific agent used, since each shear-thinning agent has its own optimum shear-thinning concentration. Also this optimum concentration increases with the increase in speed of a ship or object through the body of water. Generally speaking, even very low concentrations of shear-thinning agents produce some decrease in hydrodynamic drag. Larger concentrations will provide greater reduction in hydrodynamic drag although excessively large concentrations are to be avoided as uneconomical and they may not provide the desired decrease in hydrodynamic drag. The optimum concentration to be used for each shear-thinning agent can be easily determined by the user to provide best results.

Among the shear-thinning agents suitable for use in practicing the method of the invention are aqueous solutions or colloidal suspensions of the following:

(1) Guar gum,
(2) Karaya gum,
(3) Sodium carboxymethylcellulose,
(4) Methylcellulose (90 centipoises viscosity in a 2% aqueous solution) (Methocel–90 HG),
(5) Synthetic water-soluble polymer sold under the trademark Separan NP–20,
(6) Polyacrylamide resin (J–100 of Dowell),
(7) Ammonium alginate,
(8) Alkali salts of colloidally water-dispersible gellable interpolymers of acrylic acid and allyl sucrose, in which the allyl sucrose comprises between about 0.1 and 4.0%, preferably between about 0.75 and 1.5%, by weight of polymer, described in U.S. Patent 2,798,053 of Harold P. Brown, and sold by B. F. Goodrich under the trade name Carbopol, i.e., sodium salt of "Carbopol 934."
(9) Sodium silicate or silicate salts of a polyvalent metal, such as calcium, magnesium iron or aluminum.
(10) A dilute solution of a natural gum, such as gum tragacanth, crosslinked with sodium borate.
(11) Polyvalent salts of acrylic acid, such as calcium or magnesium acrylate.
(12) Sodium salt of an acrylic emulsion, such as the product sold under the trademark "ASE 95."

Other shear-thinning agents will be apparent to those skilled in the art after reading the present disclosure.

In order more clearly to disclose the nature of the present invention, the following examples illustrating the present invention will hereinafter be described. It should be understood, however, that this is done solely by way of example and is intended neither to delineate

Example 1

A test was conducted to determine the efficacy of the shear-thinning agents of the present invention. In the test a 17 foot boat with a 95 horsepower inboard motor was timed during its traverse of a marked straight course of approximately ½ mile over a body of water. The speed of the propeller was maintained constant throughout the run at 3300 r.p.m. The test was repeated, maintaining the speed of the propeller at the same rate as in the previous test (3300 r.p.m.), except that there was sprinkled from the bow of the boat into the water ahead of the boat as a shear-thinning agent, at a rate of 5 gallons per minute with the boat moving at a speed of about 30 miles per hour, an aqueous solution of guar gum having a concentration of 40 pounds of guar gum per 1000 gallons of solution. The solution of guar gum was distributed in sufficient quantity so that if the water was treated uniformly with the agent for ½" distance from the boat the concentration of additive would have been about 0.0006% by weight of guar gum. As a result of adding the guar gum solution to the water ahead of the boat, the speed of the boat was increased substantially.

Example 2

In another test to demonstrate the reduction in hydrodynamic drag made possible employing the method of the invention, a steel cylinder ¾ inch in diameter and having a blunt nose simulating a torpedo was dropped through a tube 12 feet long filled with liquid and the speed of the steel cylinder in dropping through the vertical tube measured. In one trial the tube was filled with water and in another the tube was filled with a 0.48% aqueous solution of guar gum. The speeds are recorded below:

| Liquid: | Average speed (ft. per sec.) |
|---|---|
| Water | 9.7 |
| 0.48% aqueous solution of guar gum | 15.7 |

As shown, the addition of 0.48% by weight of guar gum as a shear-thinning agent to the water increased the speed by about 60%.

As will be recognized by those skilled in the art from the foregoing disclosure, other shear-thinning agents as described in the foregoing description, such as an aqueous solution of sodium carboxymethylcellulose, Carbopol 934, and the other shear-thinning agents specifically referred to hereinabove, may be employed instead of guar gum as the shear-thinning agent in the foregoing examples.

The terms and expressions which I have employed are used as terms of description and not of limitation, and I have no intention, in the use of such terms and expressions, of excluding any equivalents of the features shown and described or portions thereof, but I recognize that various modifications are possible within the scope of the invention claimed.

What is claimed is:

1. A method of increasing the speed through water of an object, which comprises introducing into the water through which at least a portion of the object must travel, a shear-thinning agent which is a water-soluble polymer, and controlling the flow of the agent into the water to provide only a thin shear-thinning layer of said water-soluble polymer between the object and the water.

2. A method of increasing the speed through water of a boat, which comprises introducing into the water through which the boat must travel, a shear-thinning agent which is a water-soluble polymer, and controlling the flow of the agent into the water to provide only a thin shear-thinning layer of said water-soluble polymer between the boat and the water.

3. A method of increasing the speed through water of a boat, which comprises introducing into the water ahead of the moving boat, a shear-thinning agent which is a water-soluble polymer selected from the class consisting of guar gum, karaya gum, sodium carboxymethylcellulose, methyl cellulose, polyacrylamide resin and ammonium alginate, and controlling the flow of the agent into the water to provide only a thin shear-thinning layer of said water-soluble polymer between the boat and the water.

4. A method of increasing the speed through water of an object, which comprises introducing into the water through which at least a portion of the object must travel, a solution of guar gum, and controlling the flow of the solution of guar gum into the water to provide only a thin shear-thinning layer of said guar gum solution between the object and the water.

5. A method of increasing the speed through water of an object, which comprises introducing into the water through which at least a portion of the object must travel, a solution of karaya gum, and controlling the flow of the solution of karaya gum into the water to provide only a thin shear-thinning layer of said karaya gum solution between the object and the water.

6. A method of increasing the speed through water of an object, which comprises introducing into the water through which at least a portion of the object must travel, a solution of sodium carboxymethylcellulose, and controlling the flow of the solution of sodium carboxymethylcellulose into the water to provide only a thin shear-thinning layer of said solution of sodium carboxymethylcellulose between the object and the water.

7. A method of increasing the speed through water of a boat, which comprises introducing into the water through which the boat must travel, a solution of guar gum, and controlling the flow of the solution of guar gum into the water to provide only a thin shear-thinning layer of said solution of guar gum between the boat and the water.

References Cited by the Examiner

UNITED STATES PATENTS

| 558,671 | 4/1896 | Bruner | 114—67 |
| 1,726,882 | 9/1929 | Boerner | 114—67 |
| 1,822,223 | 9/1931 | Elinger | 114—67 |
| 2,492,173 | 12/1949 | Mysels | 137—13 |
| 2,771,996 | 11/1956 | Hulot | 210—54 |
| 2,954,750 | 10/1960 | Crump et al. | 114—67 XR |
| 3,000,790 | 9/1961 | Jeanes et al. | 210—54 |
| 3,023,760 | 3/1962 | Dever | 137—13 |
| 3,082,173 | 3/1963 | Horvitz | 210—54 |
| 3,099,993 | 8/1963 | Smith | 137—13 |

FOREIGN PATENTS

| 433,025 | 4/1948 | Italy. |
| 529,158 | 6/1955 | Italy. |
| 827,892 | 2/1938 | France. |

MILTON BUCHLER, *Primary Examiner.*

FERGUS S. MIDDLETON, *Examiner.*